Figure 1:
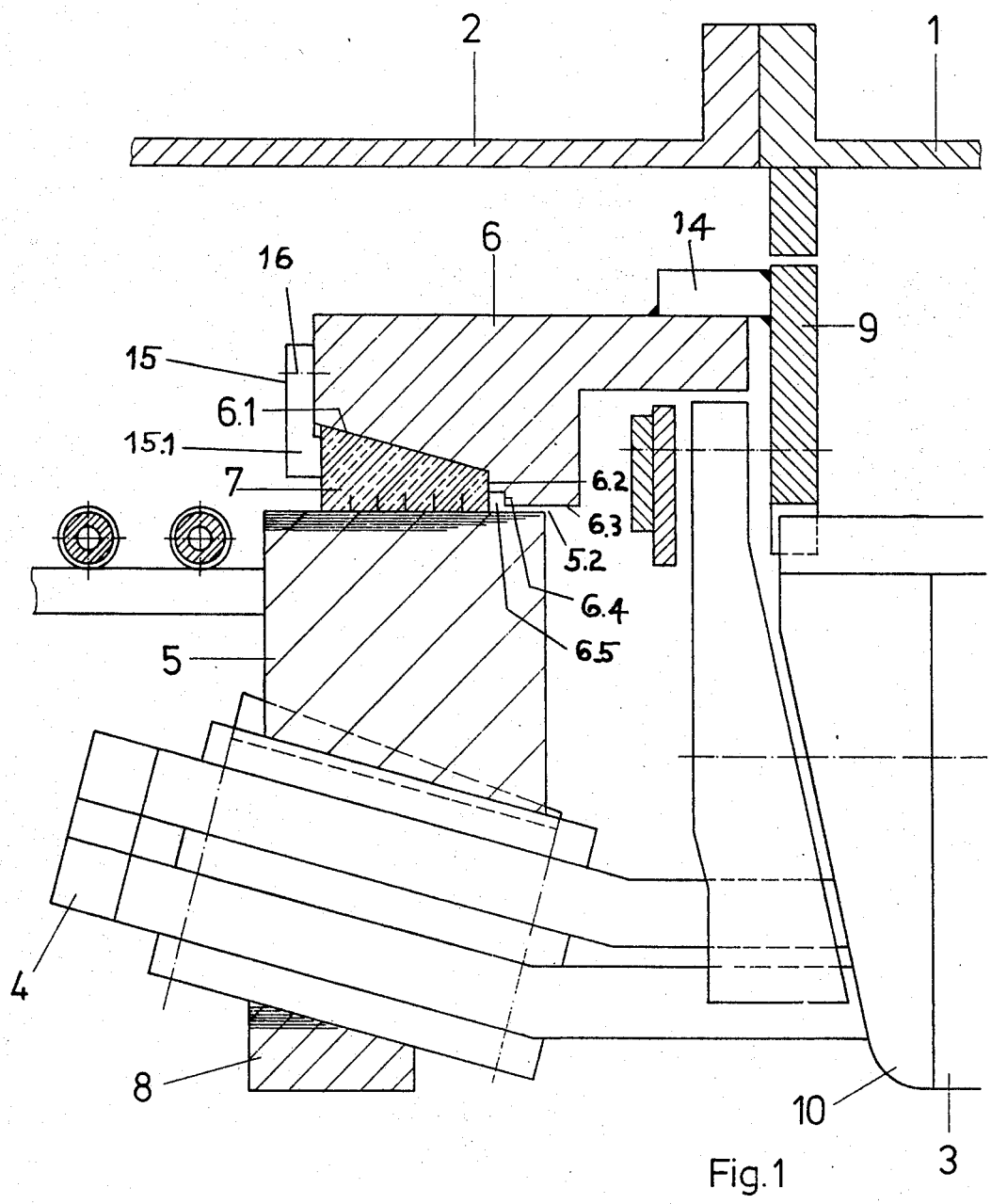

United States Patent [19]
Jäger et al.

[11] 3,988,625
[45] Oct. 26, 1976

[54] COIL OVERHANG SUPPORT FOR STATOR OF HIGH OUTPUT TURBO-GENERATOR

[75] Inventors: Kurt Jäger; Eúgen Kúnz; Jósko Vlah, all of Mannheim, Germany

[73] Assignee: BBC Brown Boveri & Company Limited, Baden, Switzerland

[22] Filed: Dec. 5, 1974

[21] Appl. No.: 529,894

[30] Foreign Application Priority Data
Dec. 15, 1973 Germany............................ 2362406

[52] U.S. Cl................................... 310/260; 310/43
[51] Int. Cl.².......................................... H02K 3/46
[58] Field of Search............. 310/206, 270, 271, 42, 310/43, 231, 45, 194; 336/187

[56] References Cited
UNITED STATES PATENTS

| | | | |
|---|---|---|---|
| 1,007,457 | 10/1911 | Lamme............................... | 310/260 |
| 1,329,242 | 1/1920 | Hellmund..................... | 310/260 UX |
| 2,980,757 | 4/1961 | Coggeshall.......................... | 310/270 |
| 2,989,657 | 6/1961 | Sampson............................. | 310/270 |
| 3,089,048 | 5/1963 | Bahn................................... | 310/270 |
| 3,320,452 | 5/1967 | Fortenbach........................ | 310/270 |
| 3,344,297 | 9/1967 | Bishop................................ | 310/260 |
| 3,691,416 | 9/1972 | Drexler............................... | 310/260 |

FOREIGN PATENTS OR APPLICATIONS

| | | | |
|---|---|---|---|
| 1,366,320 | 7/1963 | France............................... | 310/260 |
| 1,286,198 | 1/1969 | Germany............................ | 310/260 |

Primary Examiner—R. Skudy
Attorney, Agent, or Firm—Pierce, Scheffler & Parker

[57] ABSTRACT

An arrangement for supporting the head portions of the coils which project beyond the ends of the slots provided in the laminated stator component of a high-output turbo-generator in which the coils are placed includes inner and outer radially spaced rings made from a glass fiber-reinforced thermosetting synthetic resin and between which the cylindric array of the insulated coil heads is secured, and a supporting ring secured to the general housing structure of the generator which surrounds and is spaced radially from the outer coil head securing ring. A ring structure of a rubber-like resilient material, e.g. india rubber is interposed between and contacts corresponding faces of the supporting ring and the outer coil head securing ring for the purpose of compensating for unequal expansion coefficients of the copper conductors of the stator coils and the iron of the laminated stator component. This resilient ring structure which may be in the form of a continuous ring, or sub-divided circumferentially into a cylindrical array of uniformly spaced arcuate sections between which non-resilient arcuate sections can be placed, has a trapezoidal profile in cross-section, the two non-parallel faces of the ring being constituted by a radially inner face parallel to the axis of the generator and a radially outer face inclined to the generator axis. The radially inner face is provided with axially spaced, circumferentially extending slots which increase the resiliency of the material in the axial direction.

6 Claims, 4 Drawing Figures

COIL OVERHANG SUPPORT FOR STATOR OF HIGH OUTPUT TURBO-GENERATOR

The present invention relates to high-output turbogenerator structure and more particularly to an improved arrangement for supporting the portions of the coils which overhang, i.e. project beyond the ends of the slots provided in the stator component of the generator in which the coils are placed. These overhanging portions of the coils are commonly referred to as coil "heads" and this terminology will be used generally throughout the description of the present invention. It is known to support the coil heads at the opposite ends of the laminated stator structure by fixing them between an inner ring, which faces the air gap of the machine between the stator and rotor components, and an outer ring which is connected to the housing component of the generator by means of resilient components. Coil head supports of this general type are disclosed, for example, in French Pat. No. 1,366,320 and German Pat. No. 1,197,971.

As regards generators having a high output and which consequently require laminated iron stator structures having a comparatively great length, difficulties arise due to the different coefficients of expansion of the copper conductors from which the stator coils are formed and the laminated iron sheets which make up the slotted stator core, and also due to the difference in operating temperature between the laminated stator core and the housing of the generator, with the result that during operation, differences in thermal expansion up to 5 mm, can occur between the rod formed copper coil conductors and the laminated stator core. If the head portions of the coils are secured in a rigid manner to the laminated stator core, the coil head supports will not be able to follow the movements of the coil heads relative to the laminated stator structure, and there is the danger that such movement will take place entirely within the insulation sheath on the coil conductors and that the insulating sheath will separate from the copper conductors. This will lead to inclusion of air or gas into, or the breaking of, the conductor insulation, thus resulting in corona phenomena and arcovers. It can also lead to loosening of the supporting components within the coil heads.

The above-mentioned known constructions were developed for the purpose of compensating for such non-uniform expansion as between the laminated stator core and conductor copper. In order to facilitate axial displacement of the coil heads when the stator winding heats up during operation of the generator, the previously mentioned French Pat. No. 1,366,320 utilizes tapered keys which are placed between a supporting ring and the inner surface of the axially divided generator housing which is conically shaped in the axial, outward direction. These tapered keys are supported at the face of the laminated stator core by means of springs, and slide keys are located between the tapered keys and the supporting ring. The latter also rests at the face of the laminated stator core by means of springs acting in an axial direction. These springs are arranged for the purpose of facilitating return of the supporting ring in the axial direction when the generator cools off after being taken out of operation. However, with the known arrangements, very substantial friction forces are generated between the supporting ring and tapered keys which have an adverse effect upon the service life of the stator winding.

With respect to the previously mentioned German Pat. No. 1,197,971, the head portions of the coils which form the stator winding are held together by straps and mounted at supporting brackets by means of adjustable wedges. The coil head rests by way of components, flexible in only the axial direction of the generator, on the one hand at the hold-down or pressure plates which apply an axially directed force to each end of the stack of laminations which form the stator core, and on the other hand at the end of the generator housing in such manner that it can move in a relatively friction-free manner in the axial direction while being held securely against displacements in the radial and tangential directions. For this purpose, the coil head unit is held at the hold-down plate for the stator laminations by means of flat leaf springs which extend in the radial direction as well as at the end of the generator housing by springs of the same type. This known arrangement has the disadvantage that its assembly, and especially the fitting-in of the leaf springs is most difficult and time-consuming.

Also known, is the arrangement as disclosed in U.S. Pat. No. 3,089,048 for a coil head support for the stator winding of an electrical machine exploying a winding structure of the type wherein the coil head is cone-shaped and hollow - where the conductor sections of the coil head, extending at an angle to the stator axis and the insulating layers are mounted in such manner that they can move relative to the stator core. With this known arrangement, at the hold-down plate pressed against the end face of the laminated stator core there are placed supporting arms, each provided with a slot, holding a square-shaped connecting bolt which is fixedly connected to the supporting bracket but which can move quadrilaterally within the slot opening, thus making possible an axial displacement of the coil head relative to the stator lamination hold-down plate which is fixedly connected to the stator core. This arrangement is very costly from a construction point of view and its assembly is rather difficult.

Finally, there is disclosed in published German Patent Application DT-AS 1,286,198 an arrangement for the support of the front connections of the stator winding of an electrical machine of great length, using a supporting ring, stiffening the coil head, and a spring-mounted device, placed between the supporting ring and the inner face of the machine housing for the purpose of accommodating axial movement of the coil heads when the overall machine structure is heating up. This device is constructed in such manner that the supporting ring can move axially relative to the inner face of the machine housing but is held down radially with the axially divided machine housing. Rollers supported by bearing boxes are provided and arranged between the outer surface of the supporting ring and the inner face of the machine housing, these surfaces acting as a roller bed for the rollers. With the aggregate in a cold state, the bearing boxes are raised by springs in the direction of the roller bed to such degree that a slight clearance will remain between the rollers and roller bed which, however, is eliminated by expansion of the supporting ring in the radial direction when the machine heats up during operation. This known device does make possible an optimum expansion of the coil head relative to the laminated stator core, or machine housing respectively but its manufacture is costly due to the large number of components required and their rather difficult installation.

All coil head supporting structures which have been described above have relatively large dimensions in the radial direction and are therefore disadvantageous, and especially in the case of a four-pole turbo-generator which has only a very limited space in the radial direction because of the greater rotor diameter and the restrictions imposed upon the overall diameter of the generator housing.

The principal objective of the present invention is to provide an improved construction for the coil head support which advantageously is of relative smaller dimension in the radial direction, is of simple design requiring only a relatively small number of component parts, and which can be assembled in a rather simple manner without difficulty.

In accordance with the invention, the improved coil head support is comprised principally of inner and outer radially spaced rings made from an electrically insulating material between which the cylindric array of insulated coil heads is secured, a supporting ring secured to the general housing structure of the generator which surrounds and is spaced radially from the outer coil head securing ring, and a ring structure of a rubber-like resilient material, e.g. india rubber, interposed between and contacting corresponding faces of the supporting ring and outer coil head securing ring. The resilient ring structure has a trapezoidal profile in cross section, the two non-parallel faces of the ring being constituted by a radially inner face extending parallel with the axis of the generator and a radially outer face extending at an angle to the generator axis.

The radially inner face of the resilient ring structure which extends parallel with the axis of the generator can also be provided with axially spaced, circumferentially extending slots in order to increase the resiliency of the material in the axial direction.

In a preferred embodiment of the invention, the supporting ring surrounding the outer coil head securing ring is provided with a recess in which the resilient ring component is seated thereby enabling a construction with only a relatively small air gap therebetween. In the event of a short-circuit in the coil which gives rises to electro-dynamic forces, the outer ring can deflect to such an extent that this ring, by compressing the resilient ring can directly engage the adjacent surface of the supporting ring so that the latter can absorb the residual forces.

The rubber-like resilient ring structure in accordance with one embodiment of the invention can be made in the form of a circumferentially continuous ring.

In another embodiment of the invention, the resilient ring structure can be sub-divided circumferentially into a cylindrical array of uniformly spaced arcuate sections, and uniformly peripherally distributed non-resilient arcuate sections can be interposed in the spaces between some of the arcuate sections of the resilient material. With this construction, pins or like rigid structural elements are placed in radially extending blind bores provided in the outer surface of the outer coil head securing ring which engage in axially extending grooves provided in the adjacent surface of these non-resilient arcuate sections, and this arrangement serves to absorb electro-dynamic forces in the event of a short-circuit condition in the coils which act in a tangential direction.

The inner and outer coil head securing rings and the generator housing-attached supporting ring are preferably made from a conventional glass fiber-reinforced thermo-setting synthetic resin material.

Figure 2:
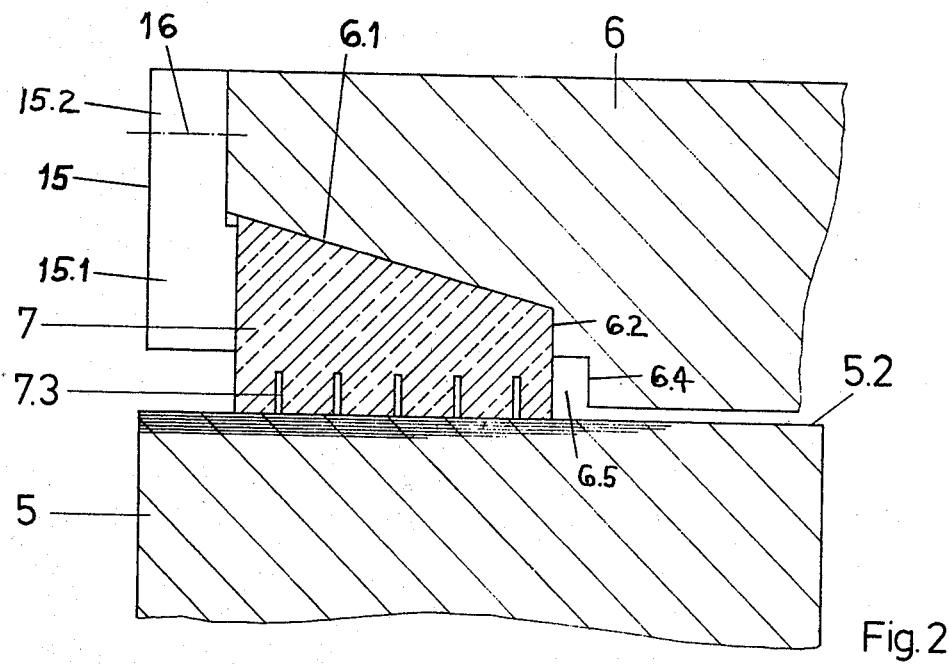
Figure 3:
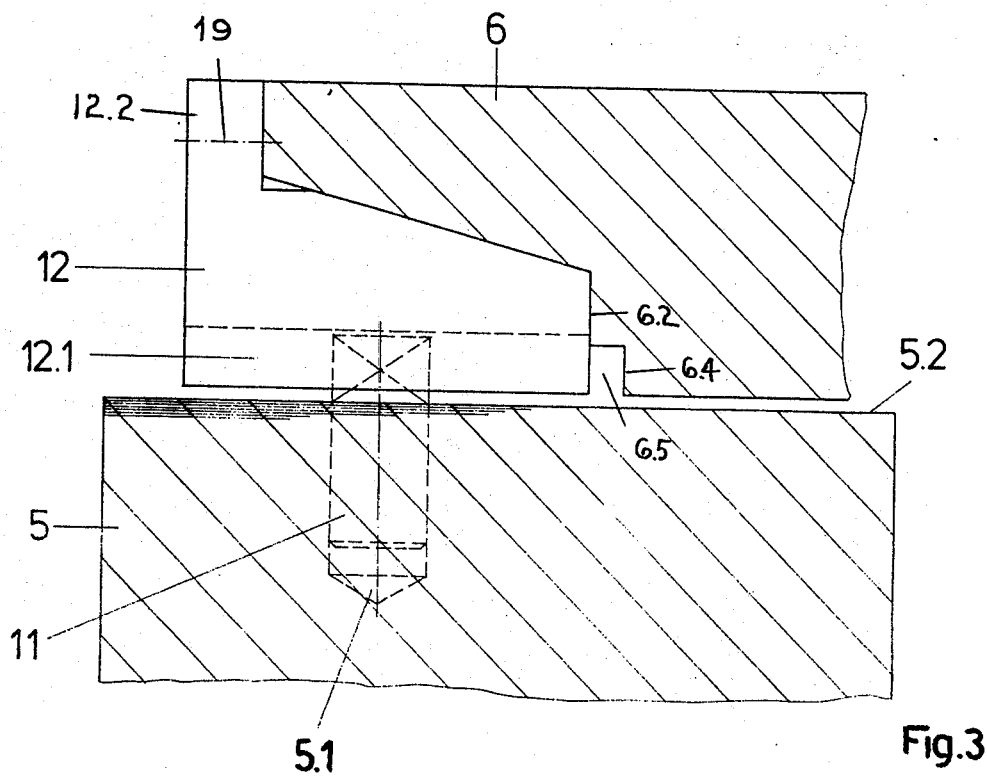
Figure 4:
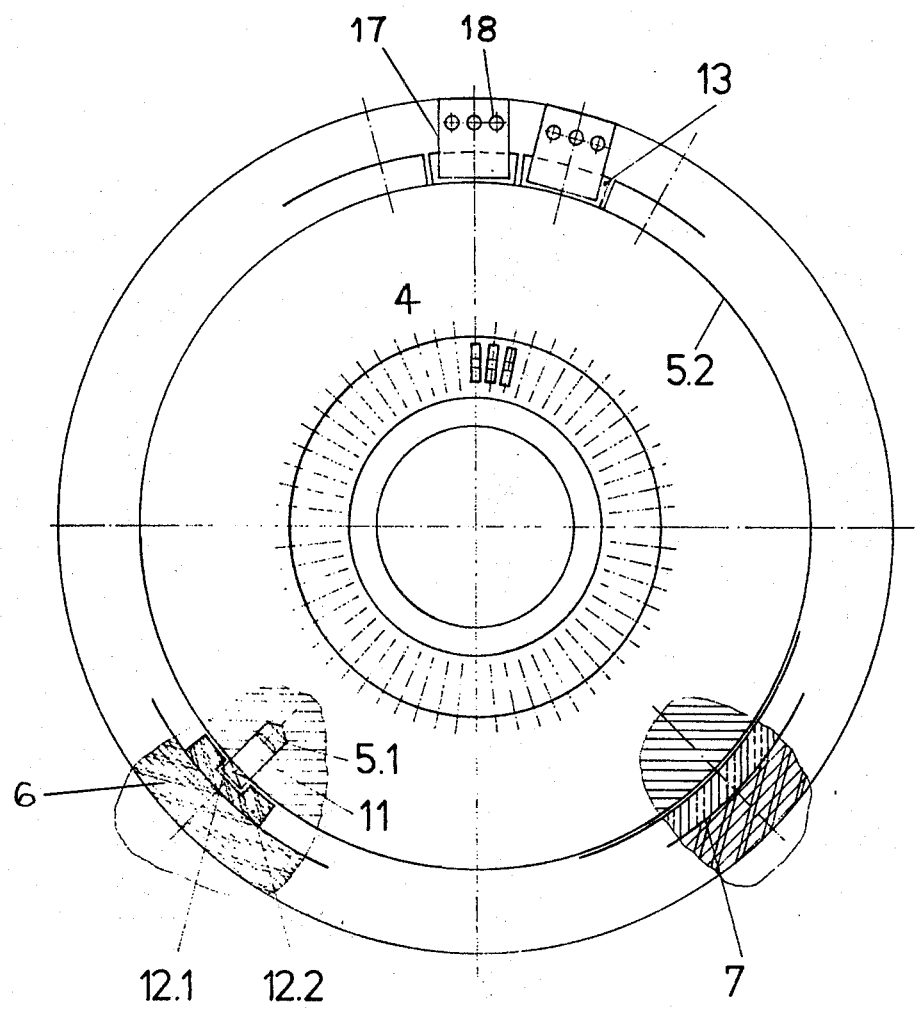

The foregoing as well as other objects and advantages inherent in the improved coil head support structure will become more apparent from the following detailed description of preferred embodiments thereof and as illustrated in the accompanying drawings wherein:

FIG. 1 is a view in longitudinal vertical section illustrating the improved coil head support structure at one end of the laminated stator core of a turbo-generator, the view showing only the portions of the support and coil head to one side of the axis of the generator, the rotor component located interiorly of the cylindrical array of coil heads having been omitted in the interest of simplification;

FIG. 2 is also a similar sectional view showing a portion of the structure included in FIG. 1 at a larger scale in order to better illustrate the details of the improved resilient component incorporated in the coil head support structure;

FIG. 3 is also a similar sectional view showing a portion of the structure included in FIG. 1 at a larger scale in order to better illustrate the details of a modified embodiment wherein the resilient ring instead of being continuous in the circumferential direction is sub-divided into a circular array of uniformly spaced arcuate sections, and non-resilient, i.e. rigid arcuate sections are interposed in the spaces between some of the resilient sections; and FIG. 4 is a somewhat schematic end view of the improved coil head support structure with certain portions shown in section so as to illustrate both embodiments of the invention, i.e. one in which the resilient ring is continuous and the other in which the ring is sub-divided in the circumferential direction.

With reference now to the drawings, the housing of the turbo-generator is indicated at 1 and the end shield of this housing which projects axially over the cylindric array of the coil heads and their supporting structure is indicated at 2. One end portion of the slotted laminated stator core constituted by a stack of iron sheet material is indicated at 3 and one of the coil heads projecting axially from the end of the stator core is indicated at 4. The conductors, in rod form, which form the stator winding are installed in a cylindrical array of slots extending longitudinally within the stator core and this results in a cylindric array of the coil heads 4 as depicted schematically in FIG. 4. The cylindric array of coil heads is fixed between two concentric radially spaced outer and inner rings 5 and 8 respectively which have sloping surfaces matching that of the slightly outwardly turned end portions of the coil heads which they engage, and the outer one of these two rings, i.e. ring 5 is mounted internally of another supporting ring 6 which is secured by way of another ring-shaped component 14 to still another ring 9 located within the machine housing 1 and which supports the hold-down plate 10 at the opposite ends of the stack of stator laminations 3. The outer and inner coil head engaging rings 5 and 8, as well as the supporting ring 6 can suitably be made of a glass fiber-reinforced synthetic resin. Located between the outer periphery of ring 5 and the inner periphery of ring 6 is a ring-shaped resilient component 7 which has a trapezoidal cross-sectional profile and is made from a resilient rubber-like material e.g. india rubber. The resilient ring 7 is seated in a recess provided in the inner periphery of ring 6, this recess comprising one surface portion 6.1 which is tapered in the axial direction to match the taper on the outer periphery of the resilient ring 7 and which merges into dual, axially spaced shoulder portions 6.2, 6.4, that merge into a cylindrical surface 6.3 parallel to the axis of the generator so that the inner diameter of one portion of the supporting ring 6 will be only slightly larger than the outer diameter of the outer ring 5. These axially spaced dual shouldered portions 6.2 and 6.4 generate an annular free space 6.5 between the inner end of the resilient ring 7 and shoulder 6.4 which facilitates flexure of ring 7 in the axial direction. As depicted clearly in the enlarged section of FIG. 2 several slots 7.3 located in axially spaced relation and extending in the circumferential direction are provided at the inner periphery of the resilient ring 7 so as to further increase the resiliency of the ring in the axial direction.

The resilient ring 7 is held securely in place within the recess in supporting ring 6 by means of a retainer ring 15 which includes a radially inner toe portion 15.1 that presses against the face of ring 7 and a radially outer portion 15.2 which is secured against the end face of the supporting ring 6 by means of bolts indicated schematically at 16.

In the embodiment of FIGS. 1 and 2, the rubber-like resilient element 7 between the outer coil head clamping ring 5 and the supporting ring 6 is in the form of a continuous ring. This construction is also depicted at a portion of the composite view shown in FIG. 4. However, the rubber-like resilient ring need not be continuous but rather can be sub-divided into a circular array of circumferentially extending, uniformly spaced, arcuate sections 13 as shown in another part of FIG. 4. These arcuate resilient sections 13 are individually held within the recess provided in ring 6 by means of retainer plates 17 which are secured to the end face of ring 6 by means of bolts 18. When this construction is used, arcuate sections 12 of a rigid material which likewise have a trapezoidal profile similar to that of the resilient ring section 13 can be inserted into circumferentially extending spaces provided between resilient ring sections 13 as depicted in another portion of the view in FIG. 4. As shown in FIG. 3 at a larger scale, each of the rigid arcuate sections 12 is situated between the outer coil head clamping ring 5 and the supporting ring 6 and includes an axially extending groove 12.1 at its inner periphery which receives the end portion of a pin 11 mounted in a radially extending blind bore 5.1 provided in ring 5. The taper at the side of the arcuate section 12 matches the taper 6.1 on supporting ring 6 so as to engage the latter, and a radially extending part 12.2 is provided so that the arcuate section can be secured to the end face of the supporting ring 6 by bolts indicated schematically at 19.

As previously explained, inclusion of the rigid arcuate sections 12 in combination with the axially extending grooves 12.1 and pins 11 enables absorption of electro-dynamic forces in the event of a short-circuit condition in the coils which act in a tangential direction.

We claim:

1. An arragement for supporting the head portions of the coils which project beyond the ends of the slots provided in the laminated stator component of a high-output turbogenerator in which the coils are placed, comprising inner and outer radially spaced rings made from an electrically insulating material and between which a cylindric array of coil heads is secured, a continuous supporting ring secured to the general housing structure of the generator and which surrounds and is spaced radially outward from said outer ring, and a continuous ring structure made from a rubber-like resilient material interposed between and in engagement with the corresponding faces of said continuous supporting ring and said outer ring for the purpose of compensating for unequal expansion coefficients of the copper conductors of the stator coils and the iron of the laminated stator component, said continuous rubber-like resilient ring structure having a trapezoidal profile in cross-section including two non-parallel faces constituted respectively by a radially inner face parallel to the generator axis and a radially outer face inclined to the generator axis.

2. A stator coil head supporting arrangement as defined in claim 1 wherein the radially inner face of said resilient ring structure is provided with a series of axially spaced circumferentially extending slots which increase the resiliency of the material in the axial direction.

3. A stator coil head supporting arrangement as defined in claim 1 wherein said resilient ring structure is seated in a correspondingly configured recess provided in the radially inner periphery of said supporting ring thereby to enable a relatively small radial gap to be maintained between the inner periphery of said supporting ring and the adjacent periphery of said outer coil head securing ring.

4. A stator coil head supporting arrangement as defined in claim 3 wherein said recess provided in said supporting ring for seating said resilient ring structure includes a radial shoulder against which the adjacent face of said resilient ring structure bears.

5. An arrangement for supporting the head portions of the coils which project beyond the ends of the slots provided in the laminated stator component of a high-output turbo-generator in which the coils are placed, comprising inner and outer radially spaced rings made from a glass fiber-reinforced thermosetting synthetic resin material and between which a cylindric array of coil heads is secured, a continuous supporting ring made from a glass fiber-reinforced thermosetting synthetic resin material secured to the general housing structure of the generator and which surrounds and is spaced radially outward from said outer ring, and a ring structure made from a rubber-like resilient material interposed between and in engagement with the corresponding faces of said continuous supporting ring and said outer ring for the purpose of compensating for unequal expansion coefficients of the copper conductors of the stator coils and the iron of the laminated stator component, said rubber-like resilient ring structure having a trapezoidal profile in cross-section including two non-parallel faces constituted respectively by a radially inner face parallel to the generator axis and a radially outer face inclined to the generator axis.

6. An arrangement for supporting the head portions of the coils which project beyond the ends of the slots provided in the laminated stator component of a high-output turbo-generator in which the coils are placed, comprising inner and outer radially spaced rings made from an electrically insulating material and between which a cylindric array of coil heads is secured, a continuous supporting ring secured to the general housing structure of the generator and which surrounds and is spaced radially outward from said outer ring, a resilient ring structure constituted by a cylindric array of uniformly spaced arcuate sections of a rubber-like resilient material interposed between and in engagement with the corresponding faces of said continuous supporting ring and said outer ring for the purpose of compensating for unequal expansion coefficients of the copper conductors of the stator coils and the iron of the laminated stator, said arcuate sections of the rubber-like resilient material having a trapezoidal profile in cross-section including two non-parallel faces constituted respectively by a radially inner face parallel to the generator axis and a radially outer face inclined to the generator axis, and a cylindric array of uniformly spaced arcuate sections made of a non-resilient material and having the same cross-sectional profile as said resilient arcuate sections interposed between adjacent sections of the latter, the inner periphery of each of said non-resilient arcuate sections including an axially extending groove which receives a pin mounted in a radial bore provided in the periphery of said outer ring.

* * * * *